April 13, 1965 H. K. WILCOX 3,178,507
SELECTIVELY INSULATED ISOLATED PHASE BUS
Filed Jan. 29, 1963
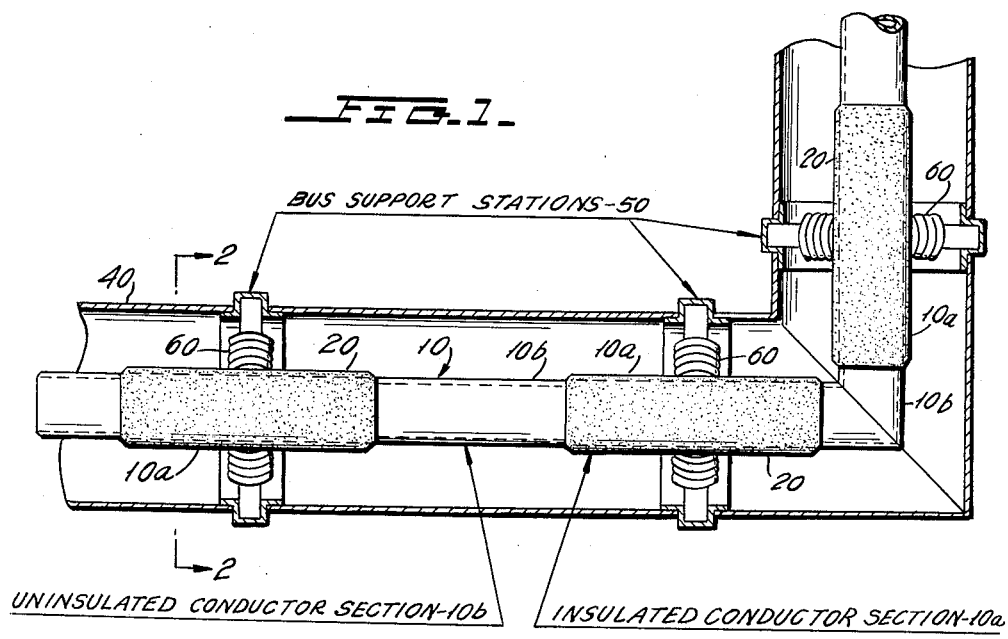
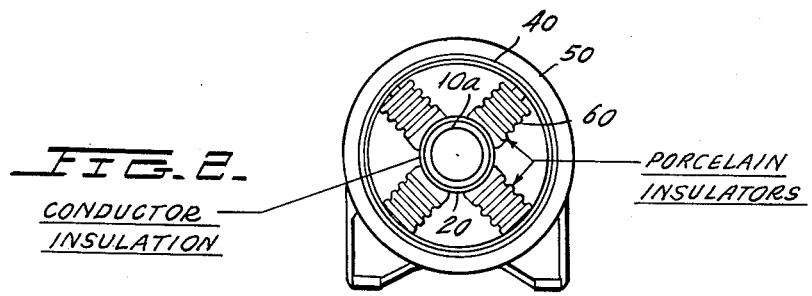
INVENTOR.
HARRY K. WILCOX
BY
OSTROLENK, FABER, GERB & SOFFEN
ATTORNEYS

United States Patent Office

3,178,507
Patented Apr. 13, 1965

3,178,507
SELECTIVELY INSULATED ISOLATED
PHASE BUS
Harry K. Wilcox, Greensburg, Pa., assignor to I-T-E
Circuit Breaker Company, Greensburg Division,
Greensburg, Pa., a corporation of Pennsylvania
Filed Jan. 29, 1963, Ser. No. 254,763
3 Claims. (Cl. 174—99)

My invention relates to an insulation system for an isolated phase bus and more particularly is directed to a novel arrangement whereby first portions of the outer surface of the bus bar, adjacent to the porcelain insulators, are covered with insulation and second portions of the bus bar, located between the porcelain insulators, are uninsulated.

Isolated phase bus, used in the electrical industry, is illustrated in U.S. Patent 2,861,119 issued on November 18, 1958, entitled "Closed Cycle Forced Cooled Isolated Phase Bus" and U.S. Patent 2,953,623 issued September 20, 1960, entitled "Forced Convection Cooling for Isolated Phase Bus" and both assigned to the assignee of the instant application.

The isolated phase bus systems are generally designed to carry currents in the many thousands of amperes and many thousands of volts and, thus, it is necessary to provide adequate insulation. Generally, the bus bars are supported on porcelain insulators to physically separate them from the metal housings. Some users of metal enclosed isolated phase electrical bus also desire that the bus bars be covered with an outer layer of insulating material. This covering of insulating material serves to provide a secondary insulation to supplement the primary porcelain insulation, and further it functions as a deterrent to excessive arc damage to the bus structure in the event of electrical flash-over within the metallic bus enclosures.

In the prior art, metal enclosed isolated phase bus structures have been built with continuous insulating conductor covering over the complete length of the bus run. One such continuous insulating covering system is described in co-pending application entitled "Epoxy and Tape Insulation for Bus Bar," by Donald C. Musgrave, Serial No. 239,211, filed November 21, 1962. In the prior art structures the insulation covering for the bus bar consists of multiple layers of varnished cambric or other suitable tape. In order to be completely effective in its function, the secondary insulation system must be continuous over the entire length of the bus bars. Therefore, such prior art designs include insulation on the bus bar over all of the elbow turns, T taps, field joints of the bus bar, and other irregularly shaped connections. Although this prior art arrangement of continuous insulation will provide maximum dielectric strength, such designs are extremely costly, i.e., the insulation functions as a deterrent to arc motoring in the event of electrical flashover within the grounded metal bus enclosure. However, both the problems and expense of providing this continuous insulation covering over the entire length of the bus bar are expensive, and it is the essence of the instant invention to provide a simple solution to the problem with a minimum of compromise in dielectric strength.

The basic concept of my invention is to provide an intermittent or selectively located secondary insulation system for the bus bars. The secondary insulation consists of suitably designed and coordinated lengths of insulation on outer surfaces of the bus bar at first portions thereof located at the porcelain insulator supporting stations with second portions of the bus bar, located between the porcelain insulators, being uninsulated. The insulator covering may be in the form of regular tape wrappings, electrical grade epoxy or other applicable materials. All of the second portions of the bus bar including the elbow turns, the tapes, joints, etc., remain bare or uninsulated. With my novel arrangement of secondary insulation, the necessary supplemental dielectric strength is provided at all bus support stations to thereby limit the arc motoring travel to the second portion comprised of the uninsulated or bare sections of the bus bar.

Accordingly, the primary object of my invention is to provide an intermittent secondary insulation system for isolated phase bus to thereby eliminate the necessity of providing continuous insulation for the bus bar and, in particular, eliminate the need for insulation at elbows, T tapes, conductor fittings and other irregularly shaped connections.

Still another object of my invention is to provide a selectively located secondary insulation system which results in considerable cost reduction to the bus fabricator and with which no special equipment, fittings, etc., are required to accommodate the insulation of these connections.

Still another object of my invention is to provide a novel insulation system which provides insulation at the porcelain insulators and thereby increases the dielectric strength of the assembly at these locations with no increase in the overall size for any given bus rating.

Another object of my invention is to provide a selectively insulated conductor system which provides protection against the possibility of arc motoring over the entire length of the bus bar in the event of electrical flashover between the bus bar and the metallic housing.

These and other objects of my invention will be apparent from the following when taken in connection with the drawings, in which:

FIGURE 1 illustrates a partial cut-away view of one phase of an isolated phase bus system, illustrating my invention.

FIGURE 2 is a cross-sectional view of the bus bar of FIGURE 1, taken in direction of the arrows 2—2.

FIGURE 1 is an illustration of my novel selectively insulated isolated phase bus system and illustrates a typical single phase of a three-phase isolated phase bus run.

FIGURE 1 includes an elbow turn at the right, three typical bus support stations with their associated porcelain insulators 60, along with the bus bar 10 and the metal enclosures 40.

The porcelain insulators 60 are located periodically along the length of the bus bar 10 and provide the positioning and supporting means for the bus bar 10 with respect to the metal housing 40. The first portions 10a of the bus bar 10 are located adjacent the portion on insulator 60 and second portions 10b of the bus bare are located between neighboring porcelain insulators 60. Insulation 20 surrounds the first portions 10a of the bus bar 10. Thus, a sufficient length of insulated covering 20 is extended on both sides of the bus support stations to effectively supplement and increase the dielectric strength of the assembly at these locations. As a result, arc motoring is restricted to the uninsulated sections which are the second portions 10b of the bus bar 10 located between the porcelain insulators 60. Since the first portions 10a of the bus bar 10 exist at all porcelain insulators 60 or supporting stations, the insulators 20 may be selcted so as to provide a desirable cushion, as seen in FIGURE 2, between the bus bar 10a and the mating ends of the porcelain insulator 60. This can eliminate the need for extra hardware on the insulator at these points of contact.

The individual insulators 60 may be contoured at their conductor ends to fit snugly with the outer surface of the insulation 20 as best seen in FIGURE 2.

Accordingly, I have provided a novel arrangement whereby the insulator system is comprised of a bus bar 10 contained within a grounded metal enclosure 40 with periodically spaced bus supoprt stations 50 having porcelain insulators 60 along the length of the bus bar. The bus bar has first portions 10a at the bus support stations provided with insulation 20 and second portions 10b located between the bus support stations 50 bare or uninsulated.

In the foregoing, the invention has been described only in connection with preferred embodiments thereof. Many variations and modifications of the principles of the invention within the scope of the description herein are obvious. Accordingly, it is preferred to be bound not by the specific disclosure herein, but only by the appending claims.

I claim:

1. An insulation system for an isolated phase bus, said isolated phase bus being comprised of a metallic housing and a bus bar; said metallic housing being positioned concentric to said bus bar; porcelain insulators positioned between said bus bar and said metaillic housing to locate and position said bus bar with respect to said metallic housing; said porcelain insulators being periodically positioned along the length of said bus bar, said bus bar being comprised of first portions adjacent said porcelain insulators and second portions between said porcelain insulators; said first portions having insulation surrounding said bus bar; said second portions being uninsulated; said insulation being positioned between said bus bar and said porcelain insulators; the insulation surrounding said bus bar extending a predetermined distance away from both sides of each associated porcelain insulator to increase dielectric strength at these positions.

2. An insulation system for an isolated phase bus, said isolated phase bus being comprised of a metallic housing and a bus bar; said metallic housing being positioned concentric to said bus bar; porcelain insulators positioned between said bus bar and said metallic housing to locate and position said bus bar with respect to said metallic housing; said porcelain insulators being periodically positioned along the length of said bus bar, said bus bar being comprised of first portions adjacent said porcelain insulators and second portions between said porcelain insulators; said first portions having insulation surrounding said bus bar; said second portions being uninsulated; said insulation being positioned between said bus bar and said porcelain insulators; said insulation providing a cushion between said bus bar and said porcelain insulators; the insulation surrounding said bus bar extending a predetermined distance away from both sides of each associated porcelain insulator to increase dielectric strength at these positions.

3. An insulation system for an isolated phase bus, said isolated phase bus being comprised of a metallic housing and a bus bar; said metallic housing being positioned concentric to said bus bar; porcelain insulators positioned between said bus bar and said metallic housing to locate and position said bus bar with respect to said metallic housing; said porcelain insulators being periodically positioned along the length of said bus bar, said bus bar being comprised of first portions adjacent said porcelain insulators and second portions between said porcelain insulators; said first portions having insulation surrounding said bus bar; said second portions being uninsulated; said insulation being positioned between said bus bar and said porcelain insulators; said insulation providing a cushion between said bus bar and said porcelain insulators; said porcelain insulators being formed at their bus bar end to fit snugly with the outer surface of said insulation; the insulation surrounding said bus bar extending a predetermined distance away from both sides of each associated porcelain insulator to increase dielectric strength at these positions.

References Cited by the Examiner

UNITED STATES PATENTS

| | | | |
|---|---|---|---|
| 2,532,845 | 12/50 | Jensen | 174—129 X |
| 2,963,331 | 5/60 | Sillers | 174—99 X |

JOHN F. BURNS, *Primary Examiner.*

JOHN P. WILDMAN, *Examiner.*